Figure 1:
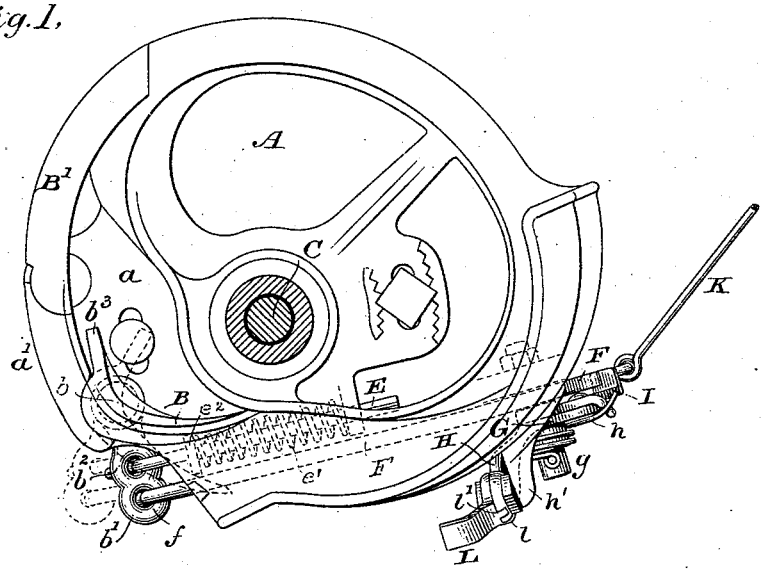

(No Model.) 2 Sheets—Sheet 1.

H. E. PRIDMORE.
HARVESTER RAKE.

No. 307,068. Patented Oct. 21, 1884.

WITNESSES
Wm. A. Skinkle
Geo. W. Breck

INVENTOR
Henry E. Pridmore
By his Attorneys (No Model.) 2 Sheets—Sheet 2.

H. E. PRIDMORE.
HARVESTER RAKE.

No. 307,068. Patented Oct. 21, 1884.

WITNESSES
Wm A. Skinkle
Geo. W. Breck

INVENTOR
Henry E. Pridmore
By his Attorneys

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

HARVESTER-RAKE.

SPECIFICATION forming part of Letters Patent No. 307,068, dated October 21, 1884.

Application filed March 3, 1883. (No model.) Patented in Canada April 7, 1884, No. 19,079.

*To all whom it may concern:*

Be it known that I, HENRY E. PRIDMORE, of Chicago, in the county of Cook and State of Illinois, have invented certain new and useful Improvements in Harvester-Rakes, of which the following is a specification.

My invention relates to the well-known type of sweep-rakes generally termed "Johnston rakes," wherein rake-arms hinged by horizontal pivots to a revolving head or crown are guided in their path to act either as reel-beaters or rakes proper by projections or rollers which take into a camway, and at one period of their sweep may be caused to follow either an inner or an outer track thereon by means of a switch or gate. Such cams have assumed different forms, and the switches have been pivoted upon vertical or inclined pivots, according to the particular form. That which I have chosen for illustrating my invention is one of the most common and widely used, the switch or gate being carried upon a vertical pivot, and beyond it a bridge, also upon a vertical or nearly vertical pivot, forming a continuation of the outer track, but swinging aside to permit the passage of the rake-rollers when they are emerging from the inner track.

The invention has for its object to improve the tripping arrangement now generally used in such rakes, whereby one or more of the rake-arms is enabled to throw the gate open to make a passage for itself along the inner track; and it consists in combining with said gate a latch, a trip-lever arranged to be depressed by a lug or tappet upon one or more of the rake-arms as they pass, and a pendent pivoted catch upon said trip-lever, having a shoulder or offset at its lower end, which shuts beneath the end of the latch when the catch is down, and thereby causes it to be lifted and unlatched whenever the lever is rocked upon its pivot by the contact of a rake-arm; in combining with said gate, gate-latch, pivoted trip-lever, and catch upon the lever, means whereby said catch can be held open to permit the lever to be rocked without releasing the latch; in combining with said gate, gate-latch, and pivoted trip-lever an adjustable arm or finger upon the upper end of the latter, which may be set radially upon its fastening-bolt, to come in contact with one or more lugs or tappets of different superficies carried by the rake-arms, and in the various other combinations and details of construction hereinafter described and claimed.

Figure 2:
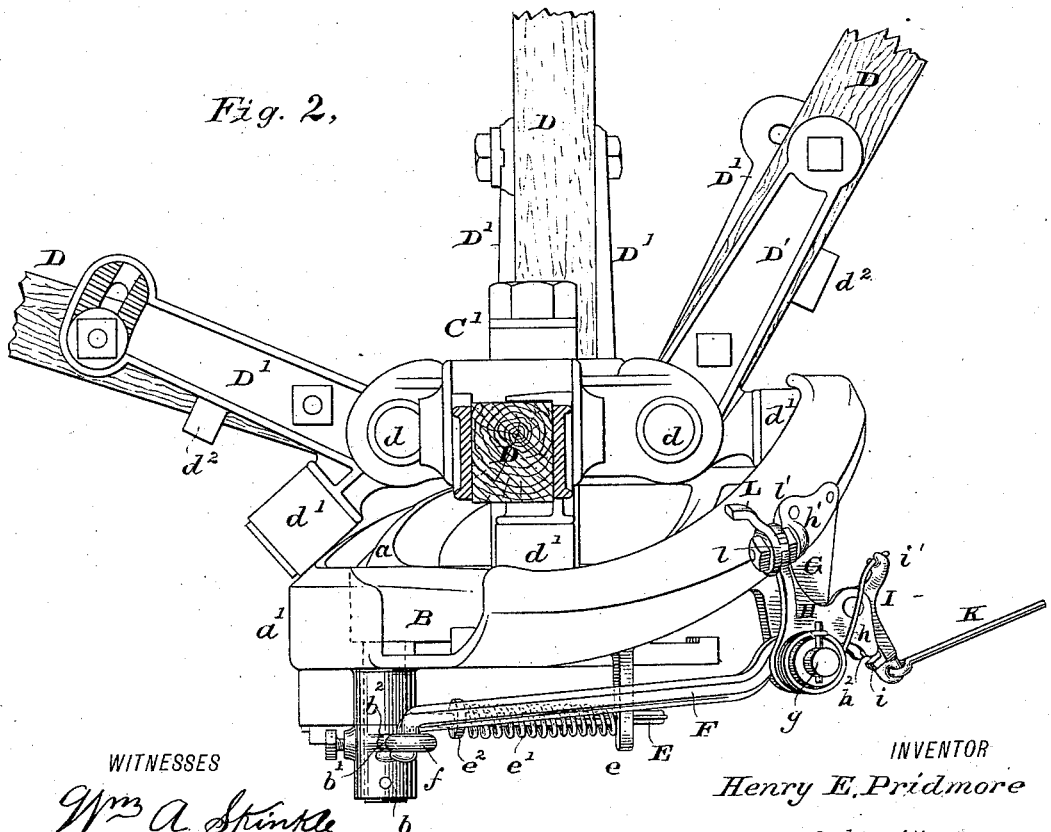
Figure 3:
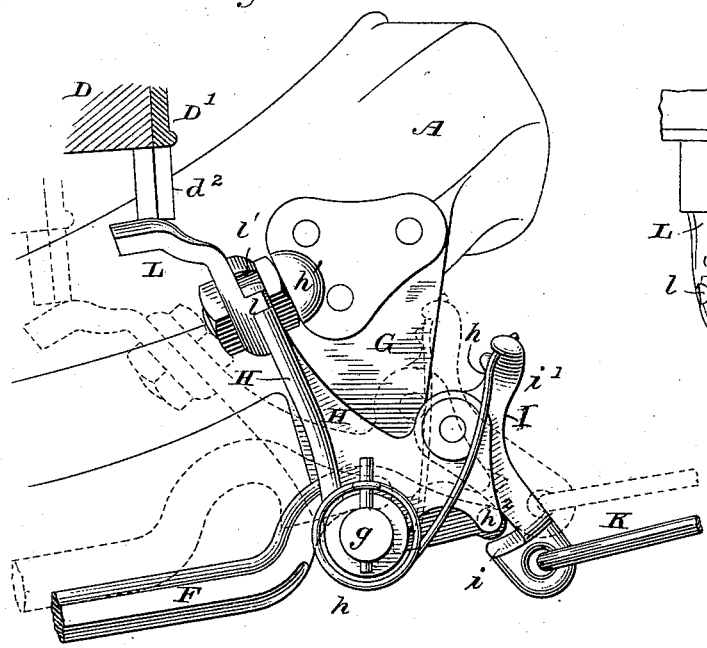
Figure 4:
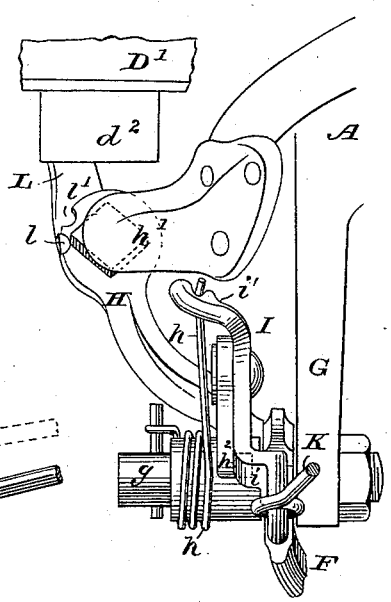

In the drawings, Figure 1 is a plan view of a rake-cam embodying my invention in its preferable form, the revolving crown and rake-arms being removed. Fig. 2 is a side elevation of said device, with crown and rake-arms in position; Figs. 3 and 4, enlarged details in side and front elevation, respectively, of the trip-lever and its catch; and Fig. 5, an enlarged detail showing the catch thrown out of action and a rake-arm acting upon the lever.

A is the rake-cam itself, of ordinary construction, having at the proper point an inner track, $a$, and an outer track, $a'$, the entrance to the former being guarded by a gate or switch, B, which, when closed, causes the rake-rollers to take the outer track, and the exit therefrom by a bridge, B', capable of swinging aside upon its pivot, to allow the rake-rollers to emerge from said inner track, but normally being held closed to afford a continuation of the outer track until the rollers traveling thereupon reach the main track.

C is a revolving spindle driven from the harvester by means of miter-gearing and tumbling-shaft connection, or other suitable means, and bearing at its top, above the cam, the crown or head C', in which rake-arms D are pivoted by horizontal pins $d$, rollers $d'$ being journaled upon heel-extensions from said arms beneath the pivot-pins in position to take into and follow the irregular cam-track. As usual in these machines, the wooden rake-arms or stales are not themselves directly pivoted to the revolving crown, but are embraced between metallic castings or shanks D', one of which is adjustable in respect to its inclination or angle with the stale, and itself bears upon an integral heel-extension, the roller appertaining to that particular rake, the purpose being to properly fit the arm for its passage over the harvester-platform. Upon this adjustable casting, or it may be upon its mate upon the other side of the stale, is a lug or tappet, $d^2$, in width extending longitudinally of the casting or stale to a distance varying with the different arms, the lugs upon some being of the same width and in the same relative position, the lugs upon others being of lesser width, or else the lugs all varying in their width, in order, as will hereinafter appear, either to cause equidistant rakes to sweep the platform, or a single rake, or else all the rakes successively. The switch or gate vibrates upon a vertical pivot, $b$, and may be pressed toward a normally-open position by means of a spring coiled about this pivot and resting at its ends against suitable projections, one upon the rake-cam and the other upon the pivot-pin; but the construction herein indicated is of another and equivalent form. From the side of the pivot-pin, or from a block pinned or keyed thereto, projects the lateral arm $b'$, having an eye, $b^2$, into which is hooked the end of a rod, E, the other end of said rod being held and guided in a hanger, $e$, in the under side of the rake-cam. A spring, $e'$, is coiled about the rod between this hanger and a collar or washer, $e^2$, upon said rod near its connection with the lateral arm from the gate-pivot, and acts against said hanger and collar as seats in such manner as to urge the rod constantly against the lateral arm, tending thus to throw the gate open whenever it may be released from any confining device. The heel of the gate is curved inwardly, as at $b^3$, so that whenever said gate has been thrown open by the spring this heel portion will come across or partly across the inner track thus opened to the passage of the rake-roller, and will be pushed forcibly back by the roller as it comes in contact therewith to swing the gate upon its pivot against the stress of the spring and close it. A second eye, $f$, in the outer end of the lateral arm $b'$, beyond the eye $b^2$, or it may be in a second independent lateral arm from the gate-pivot, affords means for the attachment of one end of a gate-latch, F, the other end of which is notched or recessed to catch over a pin, $g$, projecting horizontally from a hanger, G, from the outer shell or periphery of the rake-cam, and is confined and guided between this hanger and a trip-lever, H, supported upon said horizontal pin as a pivotal bearing. A spring, $h$, coiled about the pivot-pin, acts upon the trip-lever in such manner as to hold it normally in a vertical or substantially vertical position, resting against a stop, $h'$, upon the side of the cam, which prevents its further retreat under the force of the spring, but allows it to be moved positively in a direction opposed to such force. Pivoted to a projecting part of the trip-lever on that side of its own pivotal point away from the gate, is a catch, I, which has a shoulder, $i$, arranged to come beneath the extreme end of the gate-latch when the catch is in a pendent or nearly pendent position, and to lift it, releasing said latch from the pin over which it is hooked whenever the trip-lever is rocked upon its pivot.

Figure 5:
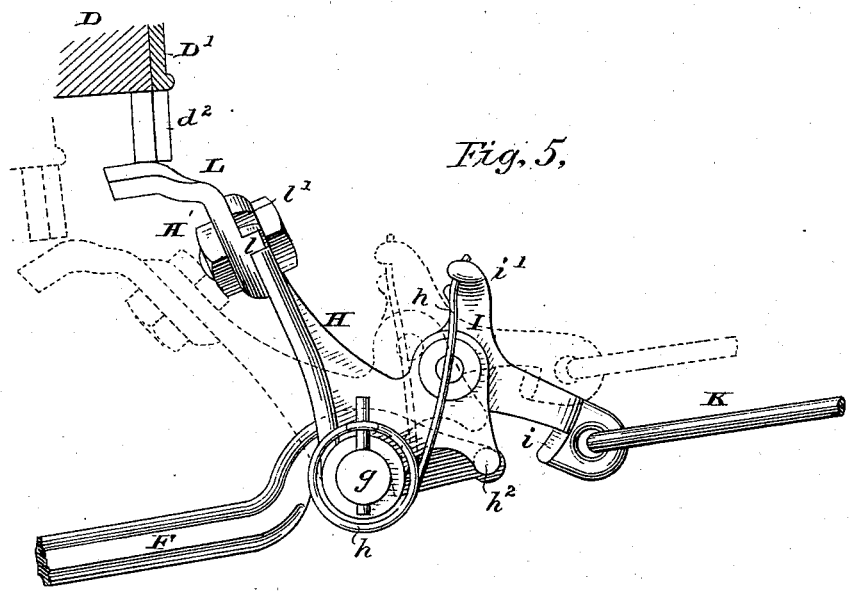

To insure the catch being invariably in proper position for action upon the end of the latch, unless purposely held out of such position, it is pressed down against the stop $h^2$, projecting from the trip-lever, by the force of a spring acting upon a heel projection, $i'$, from itself, and for convenience this pressure is imparted by the end of that same spring coiled about the pivot-pin of the trip-lever, it thus finding its seat against the trip-lever through the instrumentality of the catch, and a single spring serving to control both members. The lower end of the catch is connected by a link, K, or a chain, with a treadle or hand-lever upon the harvester in position to be controlled by the driver or attendant, so that at any time said catch may be swung out, as indicated in Fig. 5, from its normal position, thus escaping the end of the gate-latch when the trip-lever is depressed, and leaving the gate undisturbed, that the rake-roller may follow the outer track and the rake-blade act as a beater.

As thus far described, provided the trip-lever projects upward sufficiently to come into contact with the tappets upon the rake-arms, the device may be beneficially operated by fixed tappets upon one or more of said arms at regular intervals, or else by adjustable tappets on all of the rake-arms, any one or more of which may be arranged to depress the lever as its proper arm comes around, and thus open the gate and cause that arm to follow the inner track, the catch of course enabling the attendant to delay or intermit for any desired length of time the tripping action. Such constructions, therefore, are considered within the principle of my invention; but to obviate the necessity of independently adjusting lugs or tappets upon four or more rake-arms, and by a single adjustment secure the action of any desired arm or arms, I prefer, as before intimated, to make the lugs upon the rake-arms fixed in position and of varying superficies, and to mount upon the upper end of the lever a plate or finger, which may be adjusted radially thereon, to bring it according to its adjustment into the path of a lesser or greater number of tappets, so that the gate may be automatically opened at longer or shorter periods of time. To this end the upper end of the lever has a discoid enlargement centrally bored to admit a pivot-bolt. A finger, L, with discoid base, also axially bored to receive said pivot-bolt, has a lug, $l$, rising from the edge of said base adapted to take into one of a number of peripheral notches, $l'$, in the lever-head, so that by releasing the bolt it may be adjusted radially, and then again clamped rigidly in position. The notches or recesses will be so spaced that the adjustment of the finger from one to its immediate successor will bring it into the path or cause it to be acted upon by a determinately greater or less number of rake-arms, and this number may be indicated by figures stamped or impressed in the metal opposite each notch. For instance, if in a certain adjustment of the finger the trip-lever is automatically depressed, and the gate tripped by the passage of a single rake-arm in the whole series, the change of a single notch in position may cause a second rake-arm diametrically opposite the first to also actuate the trip-lever, and the change of two notches may bring three equidistant rake-arms into action.

In an application filed by me on the 2d day of March, 1883, Serial No. 86,826, I have described and claimed the combination, with the gate and gate-latch in a harvester-rake, and with a series of tappets of varying lateral length on the successive rake-arms, of a laterally-adjustable stop or finger on the free end of the lever, by which the gate-latch is released; hence I lay no claim, broadly, herein to the lateral adjustment of the finger irrespective of the manner in which such adjustment is procured.

I claim—

1. The combination, substantially as hereinbefore set forth, of the gate or switch, the gate-latch, the trip-lever arranged to be depressed by a lug or tappet upon one or more of the rake-arms as they pass, and a pendent pivoted catch upon said trip-lever, having an offset at its lower end, which shuts underneath the end of the latch when the catch is in its normal position.

2. The combination, substantially as hereinbefore set forth, with the gate, the gate-latch by which it is locked shut, the pivoted trip-lever by which said latch is released to permit the gate to open, and tappets of varying superficies upon the rake-arms, of an adjustable finger upon the upper end of the trip-lever, adapted to be set radially upon its fastening-bolt to come in contact with one or more lugs or tappets.

3. The combination, substantially as hereinbefore set forth, of the trip-lever, the catch pivoted thereto, and the single spring serving to hold said lever and catch at once in their normal positions.

4. The combination, substantially as hereinbefore set forth, of the gate-latch, the trip-lever normally in position to be actuated by tappets on the rake-arms, so as to be depressed invariably by the proper tappet, the pendent catch pivoted to said lever, and having a shoulder or offset at its lower end, which shuts beneath the end of the latch, and means whereby said catch may be opened away from the latch, in order that said latch may not be released by the depression of the trip-lever, unless so desired.

5. The combination, substantially as hereinbefore set forth, of the trip-lever, its discoid head having peripheral notches, the finger secured to said head by a bolt passing axially therethrough, and the lug upon the base of said finger adapted to be brought into engagement with any one of said notches to adjust the finger radially about the bolt.

6. The combination, substantially as hereinbefore set forth, of the trip-lever, its pivot-pin, the spring coiled thereabout, the catch pivoted in a heel-extension of said lever, and the extended arm of the spring bearing against a heel projection from said catch to hold both lever and catch in their normal position.

HENRY E. PRIDMORE.

Witnesses:
JOHN V. A. HASBROOK,
S. C. A. HOLTH.